United States Patent
Kayama et al.

[11] Patent Number: 6,049,738
[45] Date of Patent: Apr. 11, 2000

[54] CONTROL MODEL MODELING SUPPORT SYSTEM AND A METHOD THEREFOR

[75] Inventors: Masahiro Kayama, Hitachi; Jiro Kumayama, Hitachiota; Shohei Fukuoka, Hitachi; Masato Yoshida, Hitachi; Yoichi Sugita, Hitachi; Yasuo Morooka, Hitachi, all of Japan

[73] Assignee: Hitachi, Ltd., Tokyo, Japan

[21] Appl. No.: 08/811,095

[22] Filed: Mar. 3, 1997

[30] Foreign Application Priority Data

Mar. 13, 1996 [JP] Japan ................................. 8-055771

[51] Int. Cl.[7] ........................................... G05B 13/04
[52] U.S. Cl. ........................... 700/29; 700/31; 700/48; 706/23
[58] Field of Search ............................. 364/149, 151, 364/554, 578; 318/561; 706/21, 25; 700/29, 31, 48; 726/15, 23

[56] References Cited

U.S. PATENT DOCUMENTS 5,282,261  1/1994  Skeirik ........................... 706/23

FOREIGN PATENT DOCUMENTS 5-296923  11/1993  Japan .
6-168222   6/1994  Japan .

*Primary Examiner*—Albert De Cady
*Assistant Examiner*—Shelly A Chase
*Attorney, Agent, or Firm*—Kenyon & Kenyon

[57] ABSTRACT

A highly efficient, accurate and high performance modeling support system 100 for modeling a control model necessary for simulating a control object is provided, in which a plurality of data sets stored in a first data base 121 for use in modeling a plurality of control models is divided into a plurality of sub data groups each having least statistical disparity from each other by data divider 114, and stored in a plurality of sub data bases, respectively in second data base 122. Modeling means 115 constructs a control model using data in one of the plurality of sub data groups, which is then evaluated by model evaluator 116 using data in another one of said plurality of sub data groups.

15 Claims, 13 Drawing Sheets

| | $\theta_0$ | $t_1$ | $t_2$ | $t_3$ | $t_4$ | B | $\theta$ out |
|---|---|---|---|---|---|---|---|
| 1 | 30 | 610 | 1020 | 1100 | 1100 | 200 | 1100 |
| 2 | 27 | 612 | 980 | 1105 | 1099 | 200 | 1100 |
| 3 | 450 | 584 | 899 | 1095 | 1089 | 150 | 1090 |
| 4 | 21 | 599 | 910 | 1140 | 1110 | 200 | 1115 |
| 5 | 470 | 542 | 912 | 1131 | 1109 | 220 | 1114 |
| 6 | 422 | 532 | 977 | 1126 | 1104 | 150 | 1100 |
| 7 | 32 | 658 | 964 | 1101 | 1097 | 200 | 1090 |
| 8 | 411 | 614 | 935 | 1097 | 1091 | 200 | 1085 |
| ⋮ | ⋮ | ⋮ | ⋮ | ⋮ | ⋮ | ⋮ | ⋮ |

MAN - MACHINE INTERFACE

| | SUB REGIONS | NUMBER OF DATA |
|---|---|---|
| 1 | $\theta$ out $\leq$ 1090 | 351 |
| 2 | 1090 < $\theta$ out $\leq$ 1100 | 240 |
| 3 | 1100 < $\theta$ out $\leq$ 1110 | 85 |
| | ⋮ | ⋮ |
| n | 1200 < $\theta$ out | 264 |

SUPPLEMENT MORE DATA TO SUB REGION OF 1100 < $\theta$ out $\leq$ 1110

FIG.11

SUB DATA BASE 1

| | $\theta_0$ | $t_1$ | $t_2$ | $t_3$ | $t_4$ | B | $\theta_4$ |
|---|---|---|---|---|---|---|---|
| 1 | 450 | 584 | 899 | 1095 | 1089 | 150 | 1090 |
| 2 | 32 | 604 | 1014 | 1102 | 1098 | 200 | 1095 |
| 3 | 27 | 612 | 980 | 1105 | 1099 | 200 | 1100 |
| 4 | 468 | 537 | 918 | 1124 | 1105 | 220 | 1104 |
| 5 | 21 | 599 | 910 | 1140 | 1110 | 200 | 1115 |
| ⋮ | ⋮ | ⋮ | ⋮ | ⋮ | ⋮ | ⋮ | ⋮ |

SUB DATA BASE 2

| | $\theta_0$ | $t_1$ | $t_2$ | $t_3$ | $t_4$ | B | $\theta_4$ |
|---|---|---|---|---|---|---|---|
| 1 | 31 | 612 | 1020 | 1100 | 1100 | 200 | 1094 |
| 2 | 26 | 613 | 980 | 1104 | 1102 | 150 | 1104 |
| 3 | 447 | 584 | 899 | 1095 | 1089 | 150 | 1108 |
| 4 | 21 | 602 | 912 | 1138 | 1110 | 200 | 1110 |
| 5 | 468 | 542 | 919 | 1131 | 1109 | 200 | 1114 |
| ⋮ | ⋮ | ⋮ | ⋮ | ⋮ | ⋮ | ⋮ | ⋮ |

CONTROL MODEL MODELING SUPPORT SYSTEM AND A METHOD THEREFOR

BACKGROUND OF THE INVENTION

The present invention relates to a process for modeling control models applicable in the fields of steel plants, electric power plants, industrial plants and the like, and in particular, to a process for efficiently modeling a high precision control model on the basis of data collected from a control object.

A prior art data collecting method disclosed in JP-A No. 6-168222, which collects data from a control object for computer analysis, is provided with a means for collecting control information on the control object, and a memory for storing collected data independently, thereby enabling repeated simulation of the control object with the stored data.

Further, a prior art control model modeling method described in JP-A NO. 5-296923 discloses modeling of a control model on the basis of data collected from the control object, storing plural sets of relationships to cancel control errors in the control model relative to the control object using appropriate tune-in quantities to be applied when a corresponding relationship is identified by the neural network system.

The above-mentioned prior art methods, however, have the following problems.

The method of JP-A No.6-168222 discloses how to collect data from the control object, and how to store the collected data in memory of computers. However, it does not disclose nor suggest how to improve efficiency and accuracy of modeling of a control model using the collected data. Further, since a compensation of a delay from input to output in the control model is not considered, in modeling of a control model which requires different inputs and outputs at different time sequences, such compensation must be done manually. Still further, since data compression is not taken into consideration to compress stored data into an appropriate size and format that does not impede modeling of control models, data quantities accumulated in the computer become enormous when data collection is repeated.

The method of JP-A No.5-296923, although it attempts to improve the accuracy of the control model, does not take into consideration generalization of the data collected from the control objects. Thereby, when the collected data involves noise, this prior art method has the problem that the accuracy of the control model deteriorates. Further, since the validity of a control model constructed is not evaluated, when the control model constructed lacks generalization, control performance in an actual system using this control model deteriorates. Still further, since verification of the stored data stored in each subregion of the input and output regions is contemplated as to whether or not they are adequate in quantity and quality thereby to be able to construct a generalized control model, there is the problem that the accuracy of a particular output corresponding to a particular input in a particular subregion of a control model remarkably deteriorates.

The present invention has been contemplated to solve the above-mentioned problems associated with the prior art. A first object of the present invention is therefore to provide a modeling support system for modeling a control model and accurately evaluating the validity of the control model constructed.

A second object of the invention is to provide a modeling support system for modeling a control model which, when it is required to construct a control model to simulate a control object using different input and output data derived from the control object at different time sequences, compensates for a time delay of each input calculated on the basis of the operation of the control object, and stores such delay compensated data in a data base which can be directly used in constructing control models.

A third object of the invention is to provide a modeling support system for modeling a control model capable of notifying the operator of any subregion in the operational region of the control model which lacks accumulation of sufficient data, thereby avoiding any localized degradation in the performance of the control model.

A fourth object of the invention is to provide a modeling support system for modeling a control model capable of optimizing the size of its data base to store an enormous amount of data derived from its control object with a minimized loss of inherent statistical characteristics, and constructing control models using data stored in the optimized data base.

A fifth object of the invention is to provide an interactive modeling support system for modeling a control model which enables the operator to selectively actuate various control model modeling support means interactively and easily.

The first object of the invention can be accomplished by providing a modeling support system for modeling a control model to simulate a control object, comprising: a data collector for collecting data from the control object, separating the collected data into input data and its associated output data, and storing a plurality of data sets having the separated input data and its associated output data in a first data base; a data divider for dividing the plurality of the data sets stored in the first data base into a plurality of data groups each having the least statistical disparity therebetween; a second data base having a plurality of sub data bases for storing the plurality of subdivided data groups, respectively; a modeler for modeling control models to simulate the control object using a plurality of data stored in the first or the second data base; and a model evaluator for evaluating the control models constructed by the modeler using a plurality of data stored in the first or the second data base.

The second object of the invention can be accomplished by providing a modeling support system for modeling a control model comprising: a data collector for collecting data from a control object, separating the collected data into input data and output data for use in modeling a control model which can simulate the control object, determining a time at which a new input data corresponding to the output data should be collected, and storing a data set having input data collected at the determined time and the output data corresponding thereto in the first data base; and a modeler for modeling a control model for simulating the control object on the basis of the data set having the input data and the output data corresponding to each other having been stored in the first data base.

The third object of the invention can be accomplished by providing a modeling support system for modeling a control model which stores a plurality of data having been collected from a control object in a data base, and simulates the control object on the basis of the plurality of data stored in the data base, wherein the modeling support system further comprises a data quantizer: which divides input and output regions of the control model into a plurality of partial subregions, separates the plurality of data having been stored in the data base according to the partial subregions, and notifies the operator of any subregion having a smaller amount of data than a predetermined amount of data.

The fourth object of the invention can be accomplished by providing a modeling support system for modeling a control model, which stores a plurality of data having been collected from a control object in a data base, and simulates the control object on the basis of the plurality of data stored in the data base, wherein the modeling support system further comprises a data compressor which determines a smaller number of data combinations which can represent the plurality of data stored in the data base, and stores the smaller number of data combinations in the data base.

The fifth object of the invention can be accomplished by providing a modeling support system for modeling a control model comprising: a data collector for collecting data from a control object, separating the collected data into input data and output data for use in modeling a control model which can simulate the control object, determining a time at which a new input data corresponding to the output data should be collected, and storing a data set having the new input data collected at the determined time and the output data corresponding thereto in the first data base; a data divider for subdividing the plurality of data having been stored in the first data base into a plurality of sub data groups each having least statistical disparity from each other; a second data base having a plurality of sub data bases for storing the subdivided, plurality of data groups, respectively; a modeler for modeling a plurality of control models to simulate the control object using a plurality of data stored in the first or the second data bases; a model evaluator for evaluating the plurality of control models having been modified by the modeler alternatively using the plurality of data stored in the first or second data bases; a data quantizer which subdivides input and output regions of the control model into a plurality of subregions, subdivides the plurality of data having been stored in the data bases according to the subregions, and notifies, as a result of subdivision, the operator of any subregion having a smaller number of data than a predetermined number of data; a data compressor which determines a smaller number of data combinations which can represent the plurality of data sets stored in the first or the second data bases, and stores the smaller number of data combinations in the first or the second data bases; and a controller for independently controlling the data collector, the data divider, the modeler, the model evaluator, the data quantizer and the data compressor to start and stop operation thereof.

Use of the data collector according to the present invention eliminates the manual operation involved in the prior art which was required when constructing a control model using various input and output data obtained at different time sequences. Further, provision of the data utilization means according to the invention allows the operator instantly to know which data in which sub region should be sampled further in order to construct a more appropriate and accurate control model which can represent the control object. Still further, provision of the data divider and the model evaluator can verify validity of the control model that has been configured prior to actual application thereof. Use of the data compressor enables the size of the data base to be maintained at a proper size even if the quantity of data stored in the data base becomes enormous with time. In addition, use of the task controller enables the operator efficiently to select any of many methods provided for modeling a control model. Still more, in the embodiment of the invention in which different control models are evaluated and compared as to their accuracy and validity, an example is described of verifying which of the various different regression equations having different forms is more valid. However, it is not limited thereto, and other evaluation methods can be construed within the scope of the invention which can compare superiority between multi-layered neural networks each having different numbers of intermediate layers or different numbers of intermediate neurons, or between the regression model and the neural net, or which can determine a time in retrospect to collect data in a time series modeling.

BRIEF DESCRIPTION OF THE DRAWINGS

FIG. 11 is a structure of subdivided data bases according to the invention;

PREFERRED EMBODIMENT OF THE INVENTION

Figure 1:
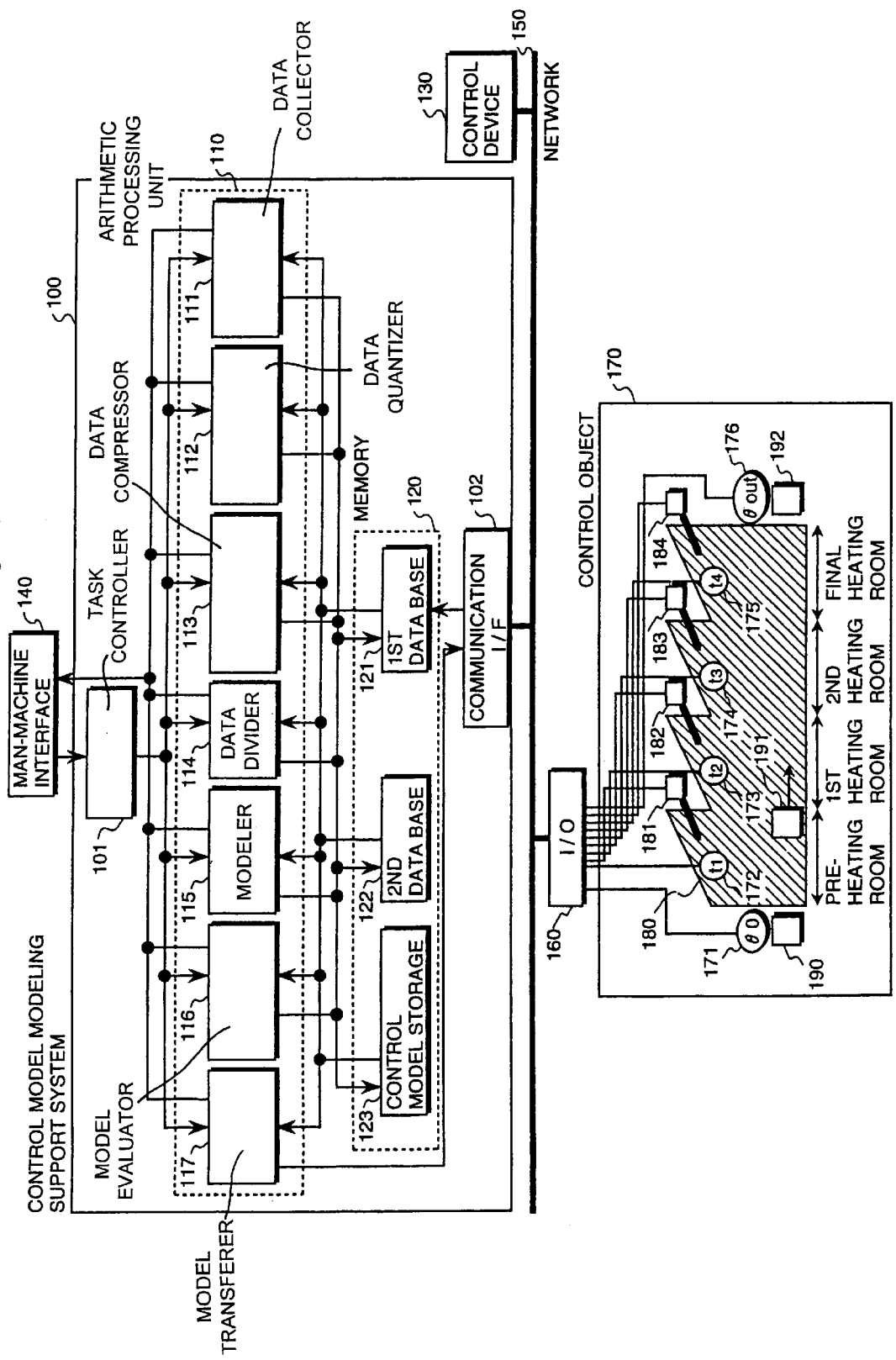
FIG. 1 is a schematic diagram of a modeling support system for modeling a control model realized by the present invention.

A schematic block diagram of a modeling support system for modeling a control model according to an embodiment of the invention is shown in FIG. 1. A general configuration of the modeling support system will be described, then, the details of respective units will be explained. A control modeling support system 100 is comprised of: arithmetic processing unit 110 which stores various tasks; task controller 101 which selectively starts various arithmetic tasks stored in arithmetic processing unit 110; memory 120 which stores data for use in modeling of control models and the control models having been constructed; and communication interface 102 for communicating signals with external units. The control modeling support system 100 is further provided with man-machine interface 140 through which the operator inputs and outputs data. The control modeling support system 100 is connected to control unit 130 and I/O unit 160 through network 150. To the control unit 130 is output a control model having been constructed in the modeling system via network 150. Various status and conditions of a control object 170 are monitored and necessary data are collected via I/O 160. Control unit 130 detects various conditions of control object 170 via I/O 160 and network 150, and outputs a control signal in order to control the control object 170 using the control model which has been constructed in control modeling support system 100. Control object 170 receives the control signal output from control unit 130 through I/O 160 to operate accordingly.

In the description of this embodiment of the invention, control object 170 will be described by way of example of a reheating furnace plant of a hot strip mill line. Reheating furnace plant 180 is provided for reheating a steel plate 190, so called as a slab, which is inserted therein prior to its rolling. After being reheated by burners 181–184 to approximately 1100° C. in the reheating furnace plant, the slab is output therefrom as a high-temperature slab 192. The reheating furnace plant generally includes four heating rooms such as a pre-heating room, a first heating room, a second heating room and a final heating room as indicated in the drawing of FIG. 1. A sensor 171 detects temperature $\theta_0$ of the slab before it enters the furnace. Sensors 172–175 detect respective temperatures $t_1$–$t_4$ in respective heating rooms. Further, a sensor 176 detects temperature $\theta_{out}$ of the slab at the exit of the furnace plant.

Figure 2:
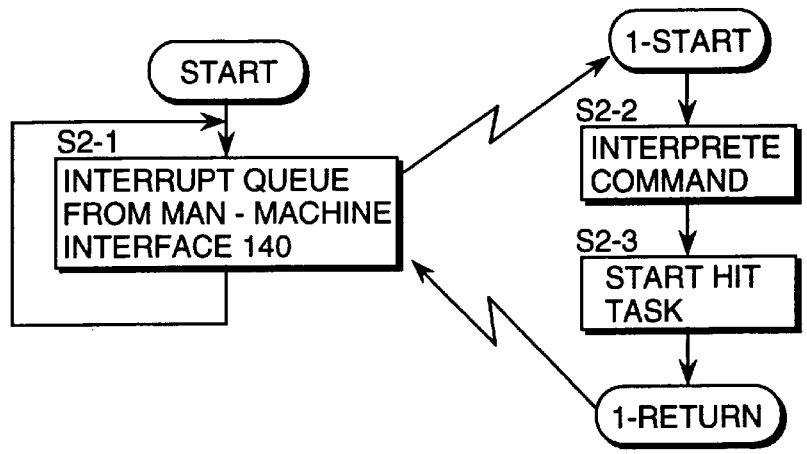
FIG. 2 is a process algorithm of a task controller of the invention.

Features and operation of respective units of control modeling support system 100 will be detailed in the following. In response to information entered by the operator via man-machine interface 140, task controller 101 starts a designated task stored in arithmetic processing unit 110. FIG. 2 indicates a process flow the task controller 101 executes. Normally, in step S2-1, presence of a signal entered by the operator via man-machine interface 140 is detected. An example of signal reception on the basis of interrupt queue is indicated. In this embodiment, however, it is not limited thereto, and a cyclic detection processing may also be used. Upon occurrence of an interrupt, the step enters into an interrupt routine at S2-2, where an interrupt command is interpreted, then a particular task in arithmetic processing unit 110 designated by the operator is activated. Arithmetic processing unit 110 in this embodiment of the invention is indicated as having tasks for: data collector 111; data quantizer 112; data compressor 113; data divider 114; modeler for modeling control models 115; model evaluator 116; and model transferee 117.

Further, memory 120 is comprised of: a first data base 121 which stores data collected from control object 170; a second data base 122 which stores subdivided plurality of data; and a control model storage memory 123 which stores control models constructed using data of the first or the second data bases.

Figure 3:
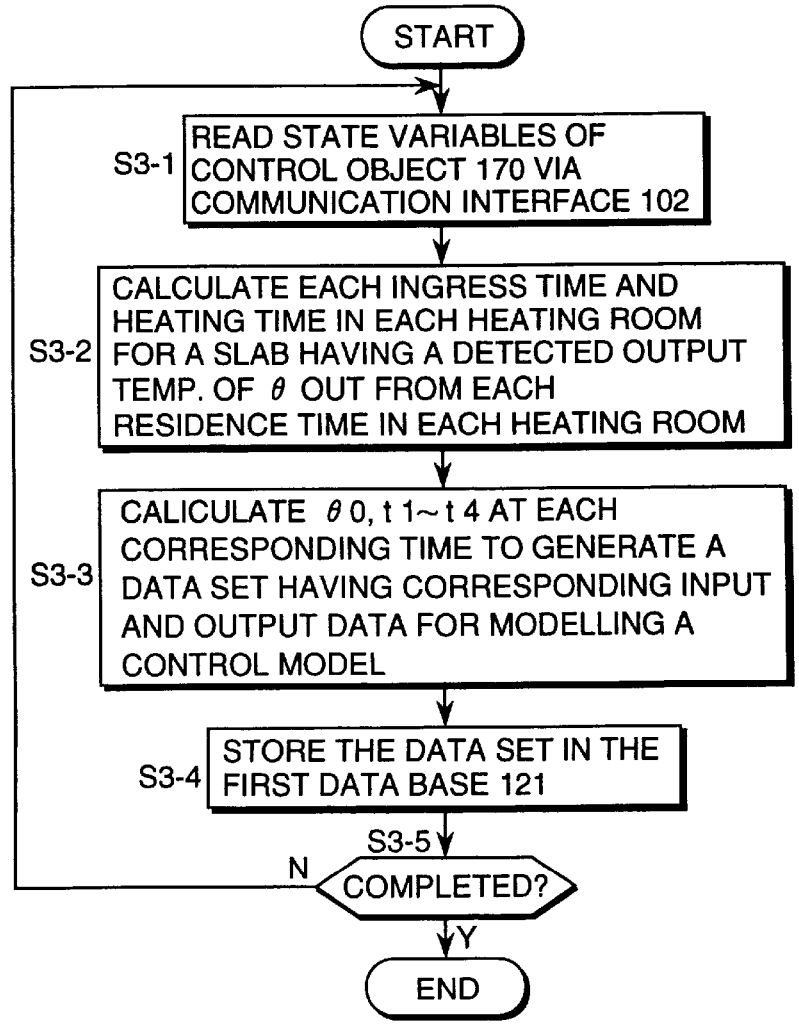
FIG. 3 is a process algorithm of a data collector of the invention.

With reference to FIG. 3, a process algorithm of data collector 111 is indicated. In response to a start command from task controller 101, data collector 111 is activated. In step S3-1, sensed values detected by sensors provided in control target 170 are entered via I/F 102 as signals corresponding to input and output of a control model. In this embodiment of the invention, values $\theta_0$, $t_1$–$t_4$, $\theta_{out}$ are entered with reference to FIG. 1.

A control model according to the invention will be described in the following by way of an example having as its inputs, $\theta_0$ and $t_1$–$t_4$, a specified slab thickness B which is predetermined, and as its output, $\theta_{out}$. It is required for the control model to be able to reproduce a relationship existing between these inputs and the output data. An example of modeling this relationship will be described. In step S3-2, for slab 192 having a detected output temperature $\theta_{out}$, each time of entry into each heating room and each period of time subjected to heating in each heating room are calculated on the basis of each residence period of time in each heating room. Reheating furnace plant 180 is comprised of four heating rooms from the preheating room to the final heating room, and each residence time in each heating room, which is defined as $T_1$–$\Delta T_4$, can be calculated from a speed of slab transfer and the length of each heating room. When the time at which $\theta_{out}$ is detected is $T_{out}$, the time $T_{in}$ at which the slab is introduced into the preheating room can be calculated by equation 1 as follows.

$$T_{in}=T_{out}-(\Delta T_1+\Delta T_2+\Delta T_3+\Delta T_4) \quad \text{(eq. 1)}$$

Further, each period of time subjected to heating in each heating room can be approximated as follows, respectively for $T_{pre}$. In the preheating room, $T_{h1}$ in the first heating room, $T_{h2}$ in the second heating room and $T_{unif}$ in the final heating room, $$T_{pre}=T_{out}-(\Delta T_1/2=\Delta T_2+\Delta T_3+\Delta T_4) \quad \text{(eq. 2)}$$

$$T_{h1}=T_{out}-(\Delta T_2/2+\Delta T_3+\Delta T_4) \quad \text{(eq. 3)}$$

$$T_{h2}=T_{out}-(\Delta T_3/2+\Delta T_4) \quad \text{(eq. 4)}$$

$$T_{unif}=T_{out}-\Delta T_4/2 \quad \text{(eq. 5)}$$

In step S3-3, a data set including correlated input data and output data is generated for modeling a control model, in which, as the input data, respective approximated periods of time Tin, Tpre, Th1, Th2, Tunif, and respective temperatures $\theta_0$, $t_1$, to $t_4$ of the slab having thickness B are associated corresponding to the output data, i.e., temperature $\theta_{out}$. Then, in step 3-4, the data set generated is stored in the first data base 121.

Figures 4, 5:
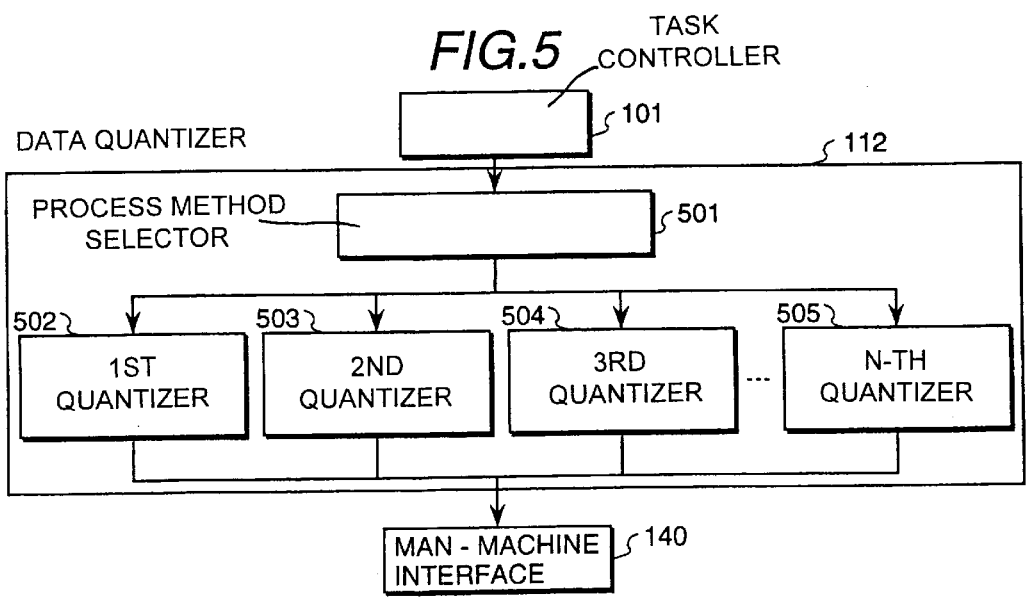
FIG. 4 is a data structure according to the invention.
FIG. 5 is a process diagram of a data quantizer of the invention.

With reference to FIG. 4, an example of a data configuration of the first data base 121 is indicated. A plurality of data sets having input data, $\theta_0$, $t_1$, to $t_4$ for the slab having thickness B, and output data $\theta_{out}$ are stored therein.

Data quantizer 112 reads out the data in the first data base 121, quantizes inherent statistical characteristics and differences or disparity between data, and notifies the operator of the results thereof. On the basis of the results, the operator determines whether or not the data present in data base 121 are sufficient to be able to construct a valid and effective control model.

An arrangement of data quantizer 112 of the invention is depicted in FIG. 5, which includes a process method selector 501 which is activated by task controller 101, and a plurality of quantizers of a first to n-th units 502–505. Plural numbers of quantizers 502–505 are provided as required, however, one unit may do as well when it suffices. Process method determiner 501 determines which of the first to n-th quantizer 502–505 should be used in response to an instruction from the user entered via task controller 101. A result of arithmetic operation by a selected quantizer is displayed on man-machine interface 140.

Figure 6:
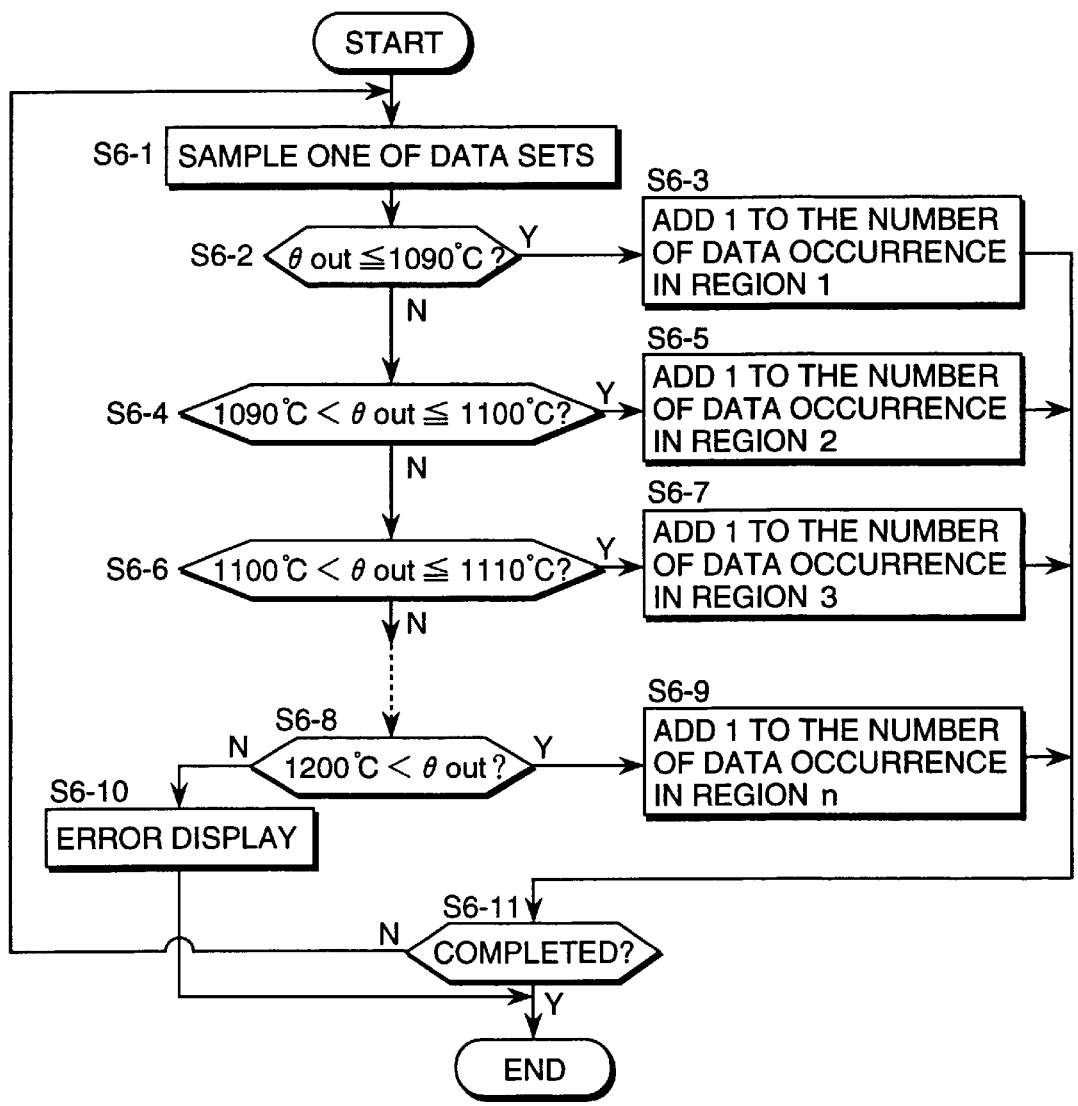
FIG. 6 is a process algorithm of the data quantizer of the invention.

An example of processing by the quantizer will be described with reference to FIG. 6. In this example, the entire region of a control model is subdivided into sub regions of n number from subregion 1 to subregion n, then, respective numbers of data occurrences for respective subregions which are stored in the first data base 121 are counted and certified to the operators. In step 6-1, a one data is sampled from the first data base 121. In step S6-2, it is judged whether or not $\theta_{out}$ of its sampled data is smaller than, for example, 1090° C. When it is smaller, 1 is added to the number of data occurrences corresponding to sub region 1 in step S6-3. When its $\theta_{out}$ is judged to be larger than 1090° C, it is further judged in step S6-4 whether it is equal to or less than 1100° C. When a result of judgment is YES, 1 is added to the number of data occurrences corresponding to sub region 2 in step S6-5. By carrying out such processing sequentially, it is calculated how may numbers of data sets stored in the first data base 121 belong to each subregion. When completion of all processing of all data set is verified in step S6-11, the process of the quantizer is completed.

Figure 7:
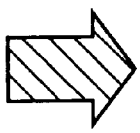
FIG. 7 is an example of information displayed by a man-machine interface.

With reference to FIG. 7, an example of notification by man-machine interface 140 of a result of quantization is indicated. The numbers of data occurrence counted in respective sub regions are displayed. A message is displayed for sub region 3 which has a level of data inclusion which is smaller than a predetermined number from those of the other subregions to incorporate more data so as to improve accuracy of modeling, which reads as "Add more data to sub region "1100° C.<θout≦1110° C."". According to this display, the operator can set a target temperature $\theta_{out}$ of slab 192 exiting from the heating furnace 180 in a range of 1100° C.<θout≦1100° C., and supplement with more data to improve the accuracy of the control modeling. The other processing carried out by the quantizer 502–505 includes quantization of variances of respective parameters $\theta_0$, $t_1$–$t_4$, B, $\theta_{out}$, computation of disparity between data stored in the first data base 121 on the basis of degrees of the quantized variances, and notification thereof.

Figure 8:
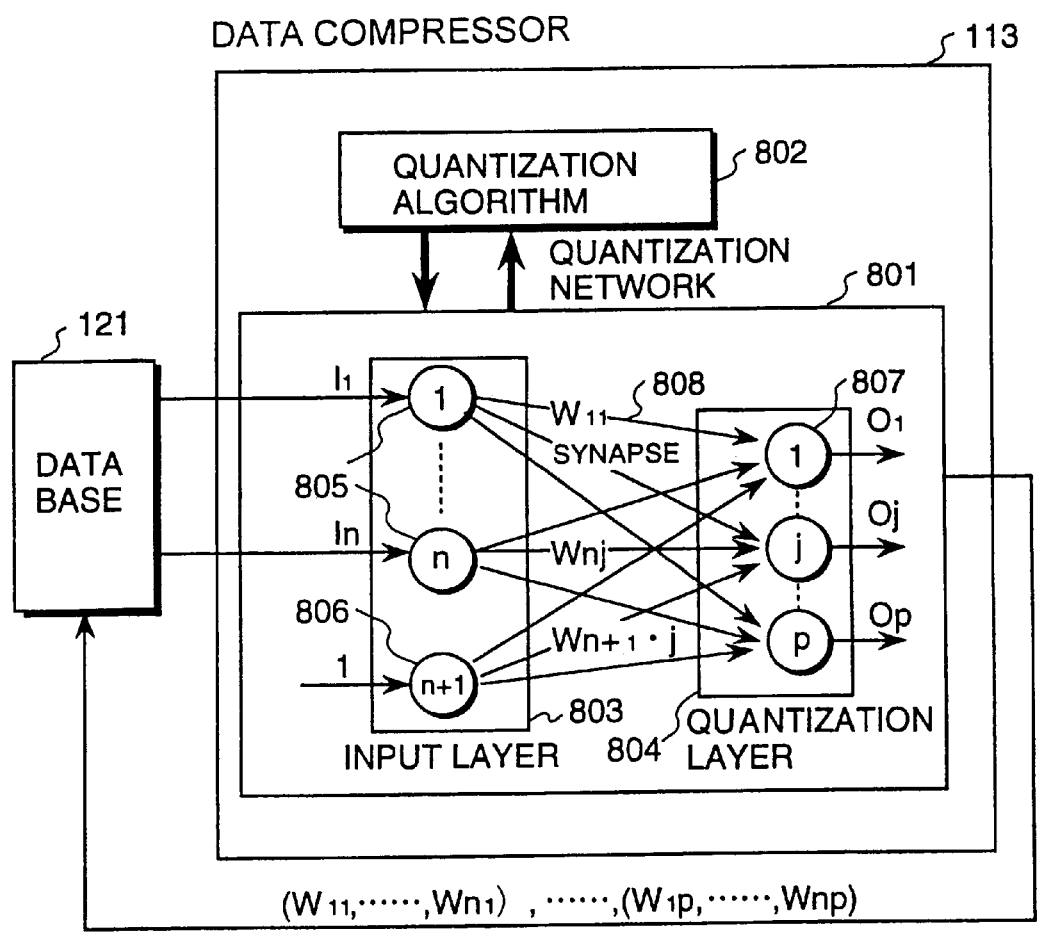
FIG. 8 is a process diagram of a data compressor of the invention.

With reference to FIG. 8, a configuration of data compressor 113 of the invention is depicted. The data compressor 113 carries out data compression to reduce the contents of data in the first data base 121 to a predetermined size while minimizing loss of data. An example of data compressor 113 having a quantization network 801 and a quantization algorithm 802 will be described. The present embodiment of the invention will be described by way of example of a case where the data in data base 121 in FIG. 1 having M number of data sets is compressed to a data having p number of data sets (p<M) which can represent substantially the data having M number of data sets. A quantization network 801 is comprised of: an input layer 803 which includes input neurons 805 for receiving inputs $I_1$ to $I_n$ (where n=6, since there are six inputs of $\theta_0$, $t_1$–$t_4$, B) and a threshold neuron 806 for outputting a constant; a quantization neuron layer 804 including quantization neurons 807 in the number of p; and a synapse 808 for communicating signals between input layer 803 and quantization neuron layer 804. Input neuron 805 outputs a signal having a value as inputted, and quantization neuron 807 outputs a sum of product of an output from input neuron 805 and a synapse weight $W_{ij}$ associated therewith by equation 6 as follows.

$$O_j = \sum_{i=1}^{n+1} W_{ij} I_i \qquad \text{(eq. 6)}$$

Quantization algorithm 802 enters inputs sequentially into quantization network 801, then, values of synapse weights are updated such that a quantization neuron which has outputted a maximum output is caused to output a 15 still larger value in response to its associated input.

Figure 9:
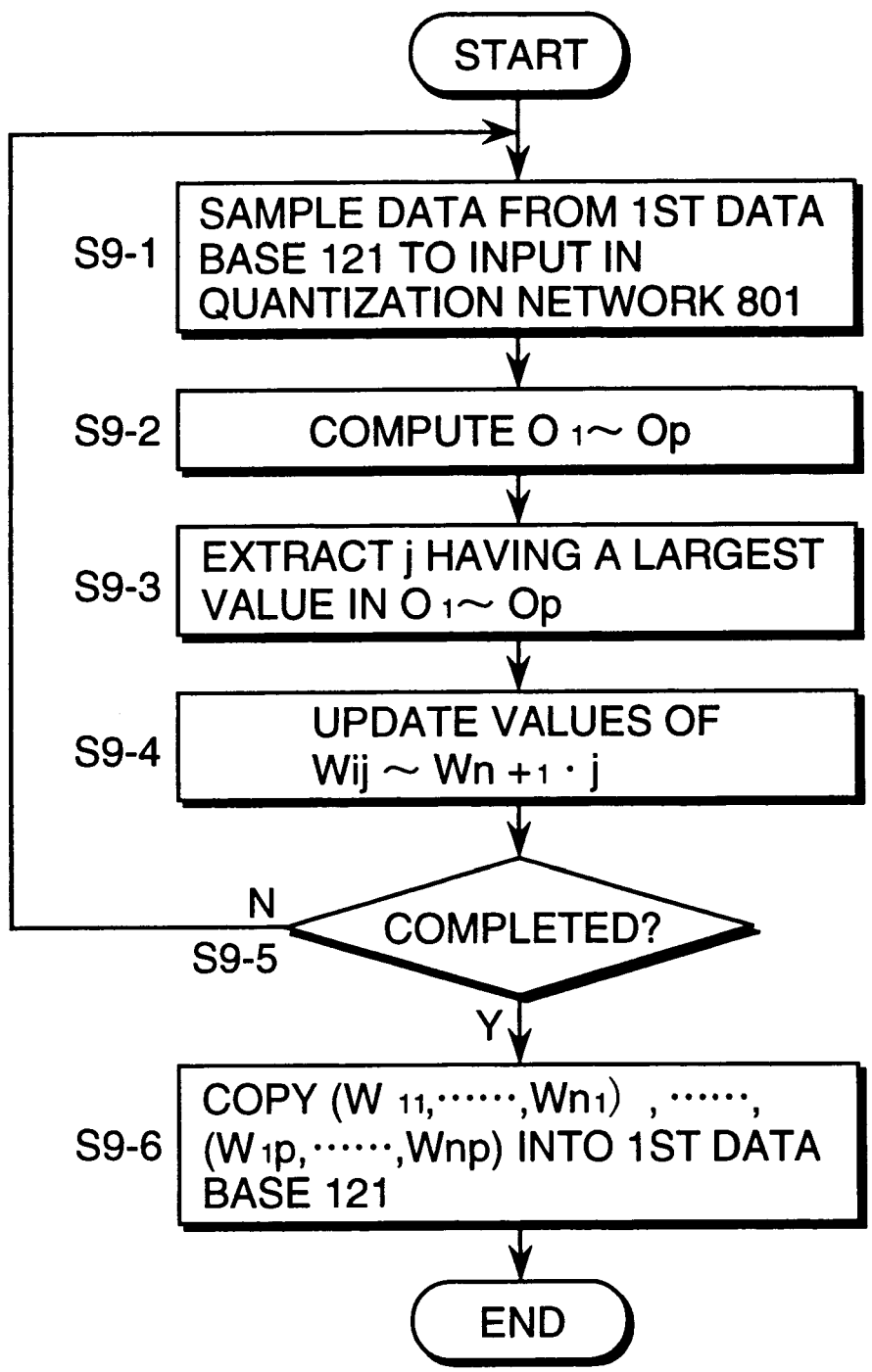
FIG. 9 is a process diagram of the quantization algorithm.

The algorithm which the quantization algorithm 802 executes is indicated in FIG. 9. In step S9-1, data sets are sampled from data base 121 to be input into quantization network 801. In the case of data compression for compressing data of FIG. 4, data strings of (30, 610, 1020, ..., 1100), (27, 612, 980, ..., 1100), (27, 612, 980, ..., 1100) which constitute respective data sets are input sequentially. Next, in step S9-2, each quantization neuron 807 is computed by equation 6 to obtain output values $O_1$ to $O_p$. A maximum value is detected from output values $O_1$ to $O_p$ in step S9-3. When $O_j$ is assumed to be maximum, synapse weights $W_{ij}$ to $W_{n+1,j}$ of synapsis connecting between quantization neuron j and associated neurons in input layer 803 are updated. For synapse weights $W_{lj}$ to $W_{n,j}$ corresponding to input neuron 805 a new value for updating is calculated by equation 7, and for synapse weight $W_{n+1,j}$ corresponding to threshold value neuron 806 a new value is calculated by equation 8 as follows.

$$W_{ij} = W_{ij} + \alpha(I_i - W_{ij}) \qquad \text{(eq. 7)}$$

where, i=1, ..., n.

$$W(n+1)j = -\left(\sum_{i=1}^{n+1} W_{ij}^2 / 2\right) \qquad \text{(eq. 8)}$$

where, $W_{ij}$ and $W_{n+1,j}$ are values of updated synapse weights corresponding to input neuron and threshold neuron, respectively, and α is a constant. Other formulas for updating synapse weights can be contemplated other than equations 7 and 8 so long as it can provide a process to enhance similarity between vectors ($W_{lj}$, ..., $W_{n,j}$) and ($I_1$ ..., In). In step S9-5, whether or not process is completed is judged. Alternatively, the process completion may be judged upon repetition of a predetermined cycle of flows from S9-1 to S9-4, or when all updated values of synapse weights for data sets sampled from data base 121 become smaller than a predetermined value. When the process is not completed, return to step S9-1 to sample data sets sequentially and repeat the same process. When all of the process described above is completed, the data sets in the number of M stored in the first data base 121 can be represented by synapse weights of quantization neurons in the number of p. Then, in step S9-6, respective synapse weights as follows, $$(W11, W21, ..., Wn1), \qquad \text{(eq. 9)}$$
$$(W12, W22, ..., Wn2),$$
$$..., \text{and}$$
$$(W1p, W2p, ..., Wnp)$$

corresponding to respective quantization neurons in the number of p are copied in the first data base 121, thereby the contents of the original data can be compressed into a small number of data of p representative of data M. By this data compression process, the memory size of the first data base 121 can be maintained at an appropriate size. The data compressor 113 according to this embodiment of the invention has been described by way of example that the data subjected to quantization and compression is already stored in the first data base 121, and the result of compression is copied in the first data base 121 so as to update the contents of the data. It is, however, not limited thereto, and a method which enters data in time series directly via communication I/F 102, and outputs a result of quantization to the first data base 121 may be used to the same effect of the invention as well.

Figure 10:
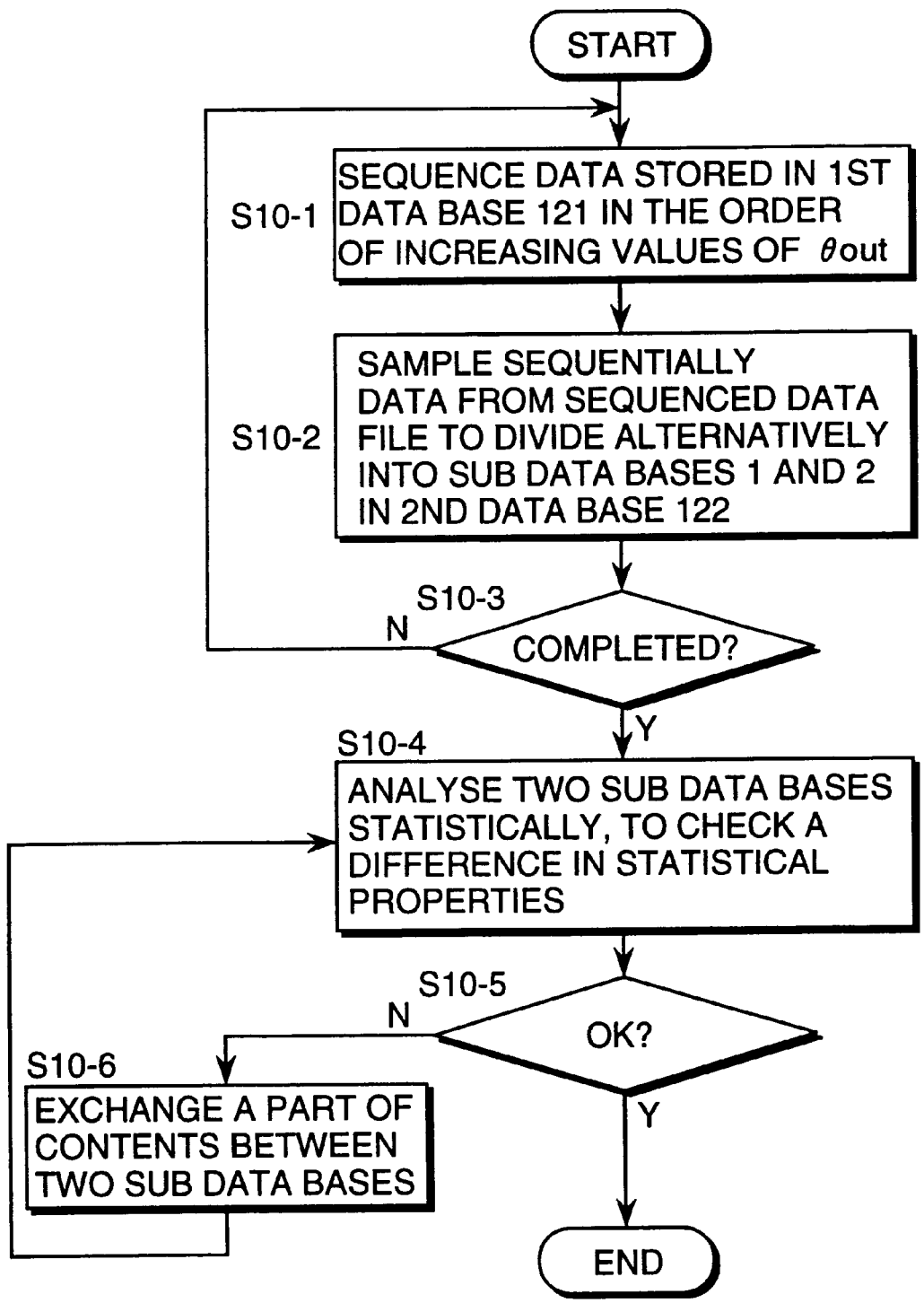
FIG. 10 is a process algorithm of a data divider of the invention.

With reference to FIG. 10, a process flow of data divider 114 is indicated. The data divider 114 divides the contents of data stored in the first data base 121 into a plurality of sub data bases each having a statistically least disparity or difference from each other, and stores these divided sub data bases in second data base 122. The present embodiment of the invention will be described by way of example of dividing the contents of data into two sub data bases. In step 10-1, the data sets stored in the first data base 121 are sequenced in the order of increasing values of $\theta_{out}$. Then, in step S10-1, the sequenced data sets are sampled alternately to be divided into sub data bases 1 and 2 in the second data base 122. Namely, data division is carried out, for example, by storing odd numbered data sets into sub data base 1 and even numbered data sets into sub data base 2. The second data base 122 which is comprised of sub data base 1 (1101) and sub data base 2 (1102) has a data base structure, for example, as shown in FIG. 11. Upon verification in step S10-3 that all the data of the first data base 121 is subdivided, in step S10-4, statistical quantities of $\theta_0$, $t_1$–$t_4$, B and $\theta_{out}$ are calculated and compared between the two sub data bases 1 and 2 in order to verify that there exists no statistical disparity or difference therebetween. As indexes of such statistical quantities for comparison, a mean value, deviation, median and the like are obtained for each parameter in the two sub data bases, and when the difference of these values of each parameter between the two sub data bases is within a predetermined allowable range, it is judged that no statistical disparity exists therebetween. Upon judgment of a result of comparison in step S10-5, when there is found no statistical disparity therebetween, it is judged that a good data subdivision has been accomplished, and the process is completed. When a substantial statistical disparity or difference is found to exist therebetween, respective data sets stored in sub data bases 1 (1101) and 2 (1102) as well as the statistical quantities having been obtained previously are displayed for the operator to carry out partial data exchanges between the two sub data bases 1 and 2, and repeat steps 10-4.

Figure 12:
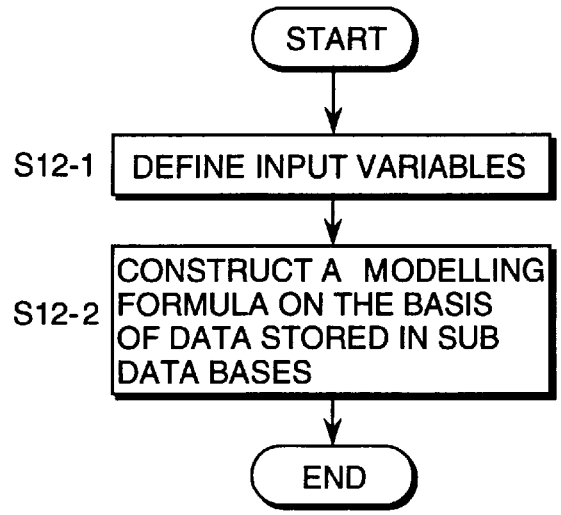
FIG. 12 is a process algorithm of a modeler of the invention.

FIG. 12 depicts a process flow for modeler 115. The modeler 115 selects either one of the first data base 121, sub data base 1 (1101) and sub data base 2 (1102), and constructs a control model to simulate the control object from the data sets stored in the selected data base, which control model has a data set including $\theta_0$, $t_1$–$t_4$, and B as its input data, and $\theta_{out}$ as its output data. As a type of control model, use of a multi-layered neural network system and the like can be contemplated, however, this embodiment of the invention will be described by way of example of a regression model. In step S12-1, input parameters of the control model are determined. In order to properly approximate a relationship existing between input data $\theta_0$, $t_1$–$t_4$ and B, and an output $\theta_{out}$, input data are determined such as $\ln(\theta_0)$, $\ln(t1)$, $\ln(t2)$, $\ln(t3)$, $(t4)^2$ and B, for example. Then, using data stored in the selected data base, a control model is constructed as follows by equation 10.

$$\theta_{out} = a_0 + a_1\ln(t_1) + a_2\ln(t_2) + a_3\ln(t_3) + a_4 t_4^2 + a_5 B \quad \text{(eq. 10)}$$

where $a_0$ to $a_5$ can be determined univocally by the well-known linear regression analysis method which is described, for example, in "Regression Analysis and Analysis of its Principle Components" published by Japan Science & Technology Association. An example of regression modeling has been described in this embodiment of the invention, however, it is not limited thereto, and various modifications of the control modeling method of the invention can be contemplated which uses the multi-layered neural network system having $\theta_0$, $t_1$–$t_4$, and B as input data, and $\theta_{out}$ as output data.

Figure 13:
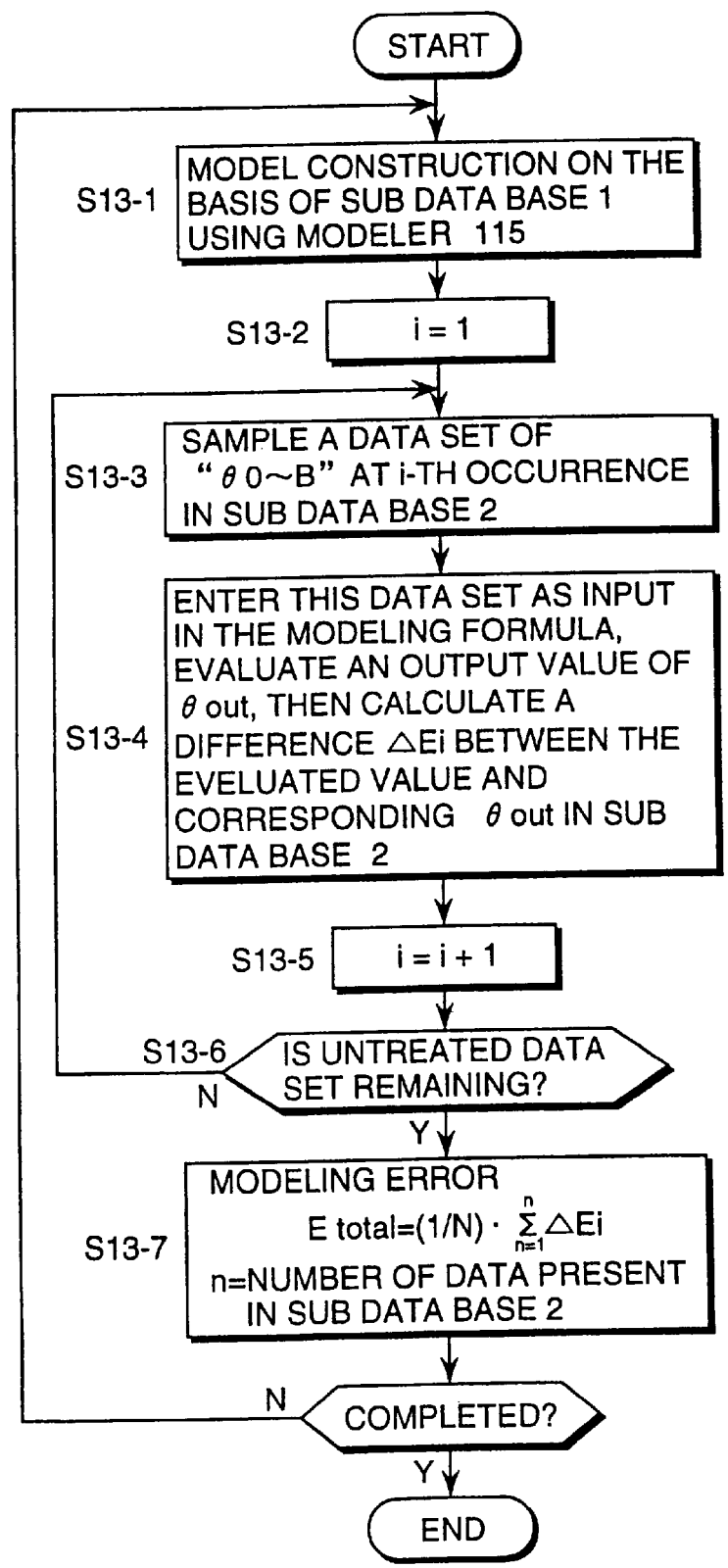
FIG. 13 is a process algorithm of a model evaluator of the invention.

With reference to FIG. 13, a process flow modeling evaluator 116 will be described. The modeling evaluator 116 evaluates suitability of a control model constructed using sub data base 1 (1101) by comparison with another one constructed using sub data base 2 (1102), or alternatively, evaluates suitability of a control model constructed using sub data base 2 (1102) by comparison with another one constructed using sub data base 1 (1101), then notifies the operator of the result of evaluation. In step S13-1, a control model is constructed using modeler 115. The process up to step S13-1 is the same as in FIG. 12. As a result, a control model, for example, as expressed by equation 10 can be constructed. In step S13-2, "i" is set at 1 (i=1). Next in step S13-3, a data set at i-th occurrence in sub data base 2 (1102) is taken out, and from which input data components $\theta_0$, $t_1$–$t_4$, B are sampled. In step S13-4, the input terms (components) in the control model equation 10 are substituted by the sampled input components, then an evaluated value $\theta_{out}$ e) calculated is compared with the output component8OU: which has been sampled as well, and a difference $\Delta E_i$ therebetween is obtained by equation 11.

$$\Delta E_i = |\Theta_{out} - \Theta_{out}(e)| \quad \text{(eq. 11)}$$

Steps 13-3 to 13-4 are repeated until there remains no untreated data sets in sub data base 2 (1102). A model error $E_{total}$ is calculated in step S13-7 by summing up differences obtained in S13-7 according to equation 12.

$$E_{total} = (1/n)\sum_{i=1}^{n} \Delta E_i \quad \text{(eq. 12)}$$

Figure 14:
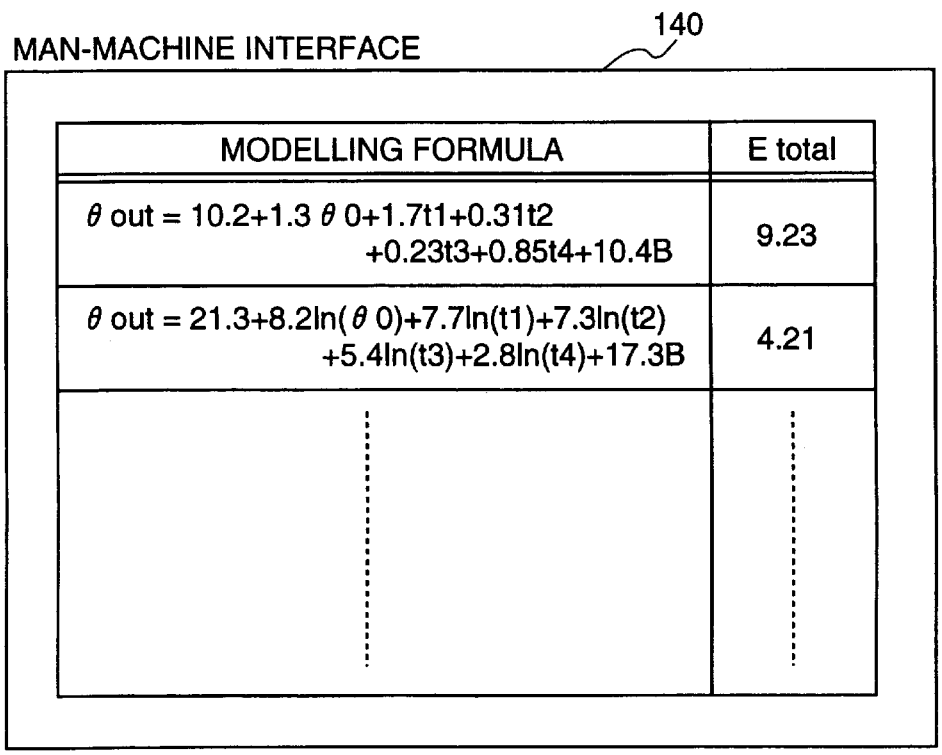
FIG. 14 is an example of display by the man-machine interface.

Completion of the process routine is judged in step S13-8. When it is judged not complete, the process returns to S13-1 to repeat steps 13-1 to 13-7 by changing input parameters to the control model. As a result, various model errors $E_{total}$ for various combinations of input parameters can be calculated. An example of display on the screen of man-machine interface 140 of such model errors are indicated in FIG. 14. Since various model errors $E_{total}$ corresponding to various control models are displayed, the operator can select an appropriate control model having the least model error. It can be also contemplated within the scope of the invention that a control model having the least Etotal is obtained automatically by the model evaluator 116 to be defined as an appropriate control model.

In response to a command from the operator received via task controller 101, model transferer 117 transfers a selected control model to control unit 130 through communication I/F and network 150.

Figure 15:
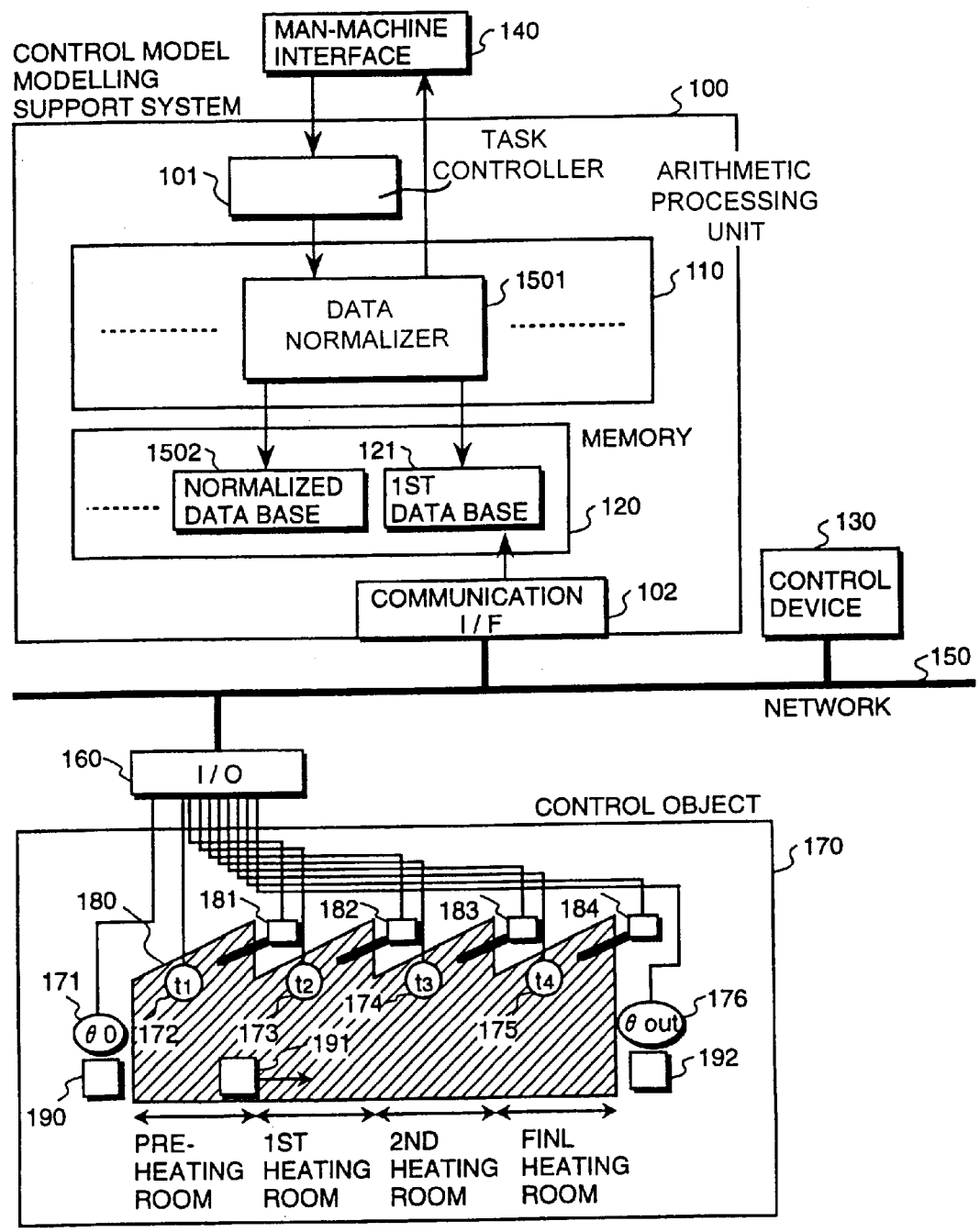
FIG. 15 is a schematic diagram of a modeling support system for modeling a control model provided with a data normalizer of the invention.

A preferred second embodiment of the invention will be described with reference to FIG. 15, in which arithmetic processing unit 110 is further provided with a data normalizer 1501. The data normalizer 1501 is enabled as required to operate in parallel with other tasks of the arithmetic processing unit of FIG. 1. In the case of constructing a control model using a multi-layered neural network, it is usually practiced that input and output data are normalized from 0 to 1 or the like, and its process is activated in response to a command from the operator via task controller 101. Data normalizer 1501 is caused to normalize each variable of data stored in the first data base 121 within a predetermined range, and store the result of normalization in normalized data base 1502. Normalized data base 1502 is utilized also in the modeling of the control model, and the data division into plural sub data bases by data divider 114 is also carried out in the same manner.

Figure 16:
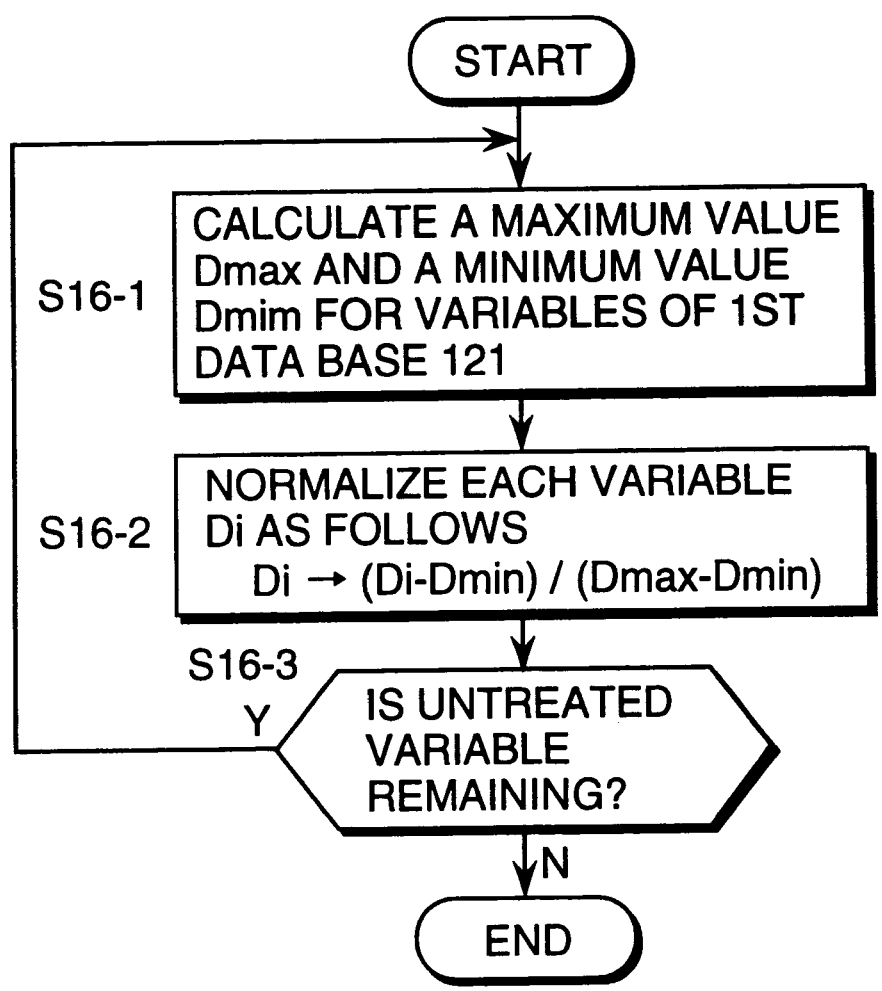
FIG. 16 is a process algorithm of a data normalizer of the invention.

A process algorithm of data normalizer 1501 is indicated in FIG. 16. In this second embodiment of the invention, an example of data normalization in a range from 0 to 1 is explained. In step S16-1, a maximum value $D_{max}$ and a minimum value $D_{min}$ of any variable of data stored in the first data base 121 are calculated. Next, in step S162, the value of this variable of data is normalized by a new value $D_i$ which is obtained by equation 13.

$$D_{i=(Di-Dmin)/(Dmax-Dmin)} \quad \text{(eq. 13)}$$

Thereby, $D_i$ has a minimum value of 0 and a maximum value of 1, and every variable of data are normalized to have a value in the range of 0 to 1. In step S16-3, it is judged whether or not there remains any variable of data which is not normalized, and if any remains, steps S16-1 to S16-2 are repeated.

The preferred embodiments of the invention have been described to be comprised of separately provided control modeling support system 100 and control unit 130 which are connected via network 150, however, it is not limited thereto, and they may be incorporated in a unit. Further, tasks assigned to arithmetic processing unit 110 can be selectively optioned as required, and it is easy to provide a new task having other functions. The control object 170 according to the embodiments of the invention has been described by way of example of the reheating furnace plant, however, it is not limited thereto, and any other control object in other field of control applications in which input data and output data are correlated for modeling a control model therefor can be construed within the scope of the invention. Further, the data compressor of the invention has been described using the vector quantization method, however, it is not limited thereto, and any other method which carries out data reduction by selecting a smaller but adequate number of data from the data base while monitoring statistical properties of the data such as a mean value and variance of each parameter so that it will not distort inherent statistical properties of the data can be construed within the scope of the invention.

We claim:

1. A control model modeling support system comprising: a means for collecting data from a control object, separating data collected therefrom into input data and output data associated with each other for modeling a control model which simulates the control object, and storing a plurality of said input data and said output data associated with each other as a data set in a first data base;

a means for dividing a plurality of said data stored in said first data base into a plurality of sub data groups, each having least statistical disparity from each other;

a second data base having a plurality of sub data bases, each for storing each of said plurality of sub data groups;

a means for constructing a control model to simulate said control object on the basis of data stored in said first or second data bases; and a means for evaluating said control model constructed by said modeling means as to its accuracy and validity using data stored in said first or said second data bases.

2. A control model modeling support system according to claim 1, wherein said means for constructing constructs a control model to simulate said control object using a plurality of data stored in one of said plurality of sub data bases in said second data base, and said means for evaluating evaluates said control model as to its validity using data stored in another one of said plurality of sub data bases in said second data base which is not utilized in constructing said control model.

3. A control model modeling support system according to claim 1, wherein, said means for constructing constructs a plurality of control models to simulate said control object using said plurality of data stored in said plurality of sub data bases in said second data base;

said means for evaluating evaluates said plurality of control models using data stored in the other sub data bases in said second data base which are not utilized in constructing said control models, and selects one from said plurality of control models which is superior over the others.

4. A control model modeling support system according to claim 1, wherein said means for collecting indicates a time at which to collect data to supplement input data corresponding to said output data of said data set on the basis of a time at which said output data is detected, and adds a set of data having input data collected at the indicated time and said output data associated thereto to be stored in said first data base.

5. A control model modeling support system comprising:

means for collecting data from a control object, separating data collected therefrom into input data and output data associated with each other for modeling a control model which simulates the control object;

means for indicating a time at which further to collect data on the basis of a time at which said output data is detected, and to add a set of data having input data collected at the indicated time and said output data associated therewith;

means for storing a plurality of said sets of data in a first data base; and means for constructing a control model to simulate said control object using said plurality of data sets having said input data and said output data associated therewith stored in said first data base.

6. A control model modeling support system comprising:

a means for collecting data from a control object, separating the collected data into input data and output data associated therewith for modeling a control model to simulate said control object, and storing a plurality of data sets having said input data and said output data associated therewith in a first data base;

a means for dividing said plurality of data sets stored in said first data base into a plurality of sub data groups each having least statistical disparity from each other;

a second data base having a plurality of sub data bases for respectively storing said plurality of sub data groups; and a means for modeling a control model to simulate said control object using data stored in said first or second data bases.

7. A control model modeling support system according to claim 6, wherein said means for dividing calculates statistical quantities such as an average, variance, median, and standard deviation for each variable in each of said plurality of data groups, and exchanges part of data between said plurality of data groups in said second data base when a difference of values calculated becomes larger than a predetermined value.

8. A control model modeling support system comprising:

means for collecting a plurality of set of data from a control object for modeling a control model which simulates the control object, and storing said collected data in a data base;

means for constructing a control model to simulate said control object on the basis of data stored in said data base;

means for subdividing an input and output region of said control model into a plurality of sub regions;

means for separating the plurality of sets of data stored in said data base according to the subdivided plurality of sub regions; and means for notifying a operator of any sub region having a smaller amount of data than a predetermined amount of data.

9. A control model modeling support system comprising:

means for collecting a plurality of set of data from a control object for modeling a control model which simulates the control object, and storing said collected data in a data base;

means for constructing a control model to simulate said control object on the basis of data stored in said data base; and means for determining a small number of data combinations which can represent said plurality of sets of data stored in said data base, and storing said small number of data combinations into said data base.

10. A control model modeling support system comprising:

a means for collecting a plurality of data from a control object to be stored in a first data base, separating said plurality of data as input and output data from which to construct a control model which can simulate the control object, determining a time for collecting a new input data corresponding to said output data on the basis of a time at which said output data was detected, and adding a data set having the new input data collected at the determined time and said output data detected to be stored in said first data base;

a means for dividing the plurality of data stored in said first data base into a plurality of sub data groups, each having least statistical disparity from each other;

a second data base having a plurality of sub data bases for storing said plurality of sub data groups having been divided, respectively;

a means for modeling a plurality of control models to simulate said control object using the plurality of data stored in said first or said second data bases;

a means for subdividing input and output regions for said control model into a plurality of sub regions, separating said plurality of data stored in said data bases according to said plurality of sub regions having been divided, and notifying the operator of any sub region having a smaller number of data than a predetermined number of data;

a means for determining a small number of data combinations which can represent said plurality of data stored in said first or second data bases, and storing said small number of data combinations determined into said first or said second data bases; and a means for independently controlling said means for collecting, said means for dividing, said means for modeling, said means for evaluating, said means for subdividing, and said means for determining to start and stop operation thereof.

11. A control model modeling support method comprising the steps of:

separating a plurality of data collected from a control object as an input and an output data for modeling a control model to simulate said control object, and storing a plurality of data sets having input and said output data associated each other in a first data base;

dividing said plurality of data sets stored in said first data base into a plurality of sub data groups, each having least statistical disparity from each other, and storing said plurality of sub data groups having been divided into a second data base having a plurality of sub data bases, respectively;

modeling a plurality of control models to simulate said control object using a plurality of data stored in said first or said second data bases; and evaluating said plurality of control models using a plurality of data stored in said first or said second data bases.

12. A control model modeling support system comprising:

a data collector that collects input data and output data from a control object;

a first database that stores said input data and said output data;

a data divider that separates a plurality of said data stored in said first database into a plurality of data subsets;

a second database that stores said data subsets;

a modeler that constructs a model to simulate said control object on the basis of the data in said first database;

a model evaluator that assesses the accuracy and validity of said control model on the basis of the data in said second database.

13. The control model modeling support system of claim 12, wherein said data subsets have the smallest possible statistical disparity from one another.

14. The control model modeling support system of claim 12 further comprising:

a data quantizer that analyzes the number of data values in subregions of said data in said first or said second database, and reports if the number of values in a particular subregion is less than a predetermined value.

15. The control model modeling support system of claim 14 further comprising:

a data compresser that determines a set of data combinations that represents said data in said first or said second database and that is smaller than the number of data values in said first or said second database.

* * * * *

UNITED STATES PATENT AND TRADEMARK OFFICE
CERTIFICATE OF CORRECTION

PATENT NO.   : 6,049,738
DATED        : April 11, 2000
INVENTOR(S)  : Masahiro Kayama et al.

It is certified that error appears in the above-identified patent and that said Letters Patent is hereby corrected as shown below:

Title page,
Item [57], ABSTRACT,
Line 9, change "Modeling means" to -- Modeler --.

Column 5,
Line 45, change "transferee" to -- transferer --.

Column 6,
Line 22, change "$T_{out-(\Delta T1}/2=$" to -- $T_{out}-(_\Delta T_1/2=$ --.

Column 9,
Line 54, before "out=" insert -- $\theta$ --.

Column 11,
Line 8, change "$D_{i=(Di-Dmin)}/(D_{max}-D_{min})$" to -- $D_i=(D_i-D_{min})/(D_{max}-D_{min})$ --.

Signed and Sealed this

Tenth Day of May, 2005

JON W. DUDAS
*Director of the United States Patent and Trademark Office*